(12) United States Patent
Kasper et al.

(10) Patent No.: US 10,304,143 B2
(45) Date of Patent: May 28, 2019

(54) CONSENSUS SYSTEM FOR MANIPULATION RESISTANT DIGITAL RECORD KEEPING

(71) Applicants: Lance Timothy Kasper, Downers Grove, IL (US); Vikram Rajkumar, Monroeville, PA (US)

(72) Inventors: Lance Timothy Kasper, Downers Grove, IL (US); Vikram Rajkumar, Monroeville, PA (US)

( * ) Notice: Subject to any disclaimer, the term of this patent is extended or adjusted under 35 U.S.C. 154(b) by 231 days.

(21) Appl. No.: 15/147,836

(22) Filed: May 5, 2016

(65) Prior Publication Data

US 2017/0323392 A1    Nov. 9, 2017

(51) Int. Cl.
*G06Q 30/00* (2012.01)
*G06Q 40/00* (2012.01)
*H04L 29/06* (2006.01)
*H04W 12/10* (2009.01)

(52) U.S. Cl.
CPC .......... *G06Q 40/12* (2013.12); *H04L 63/123* (2013.01); *H04W 12/10* (2013.01)

(58) Field of Classification Search
CPC ................................ G06Q 40/12; H04L 67/12
USPC .................................................. 705/30, 14.43
See application file for complete search history.

(56) References Cited

U.S. PATENT DOCUMENTS

| | | | | |
|---|---|---|---|---|
| 2013/0325701 | A1* | 12/2013 | Schwartz | G06Q 40/00 705/39 |
| 2015/0033301 | A1* | 1/2015 | Pianese | H04L 63/083 726/5 |
| 2015/0271183 | A1* | 9/2015 | MacGregor | H04L 63/102 726/4 |
| 2016/0224949 | A1* | 8/2016 | Thomas | G06Q 20/027 |
| 2016/0261690 | A1* | 9/2016 | Ford | H04L 67/1044 |

* cited by examiner

*Primary Examiner* — Rokib Masud
(74) *Attorney, Agent, or Firm* — The Law Offices of Konrad Sherinian LLC

(57) ABSTRACT

The disclosure describes a peer-to-peer consensus system and method for maintaining a manipulation resistant updateable shared ledger. The system achieves consensus on a shared ledger between a plurality of peers and prevents double spending in light of network latency, data corruption and intentional manipulation of the system. Consensus is achieved and double spending is prevented via the use of the widest chain metric to choose a single consensus transaction record. A trustable record is also facilitated by allowing stakeholders to elect a set of trusted non-colluding block signers to cooperatively add transactions to the consensus record. The voting mechanism is a real-time auditable stake weighted approval voting mechanism.

2 Claims, 9 Drawing Sheets

| UTXO I.D. | UTXO balance | # of candidates selected | delegated stake per candidate | Block Signer Candidate # Votes ||||||| Block Signer Candidate # Summed Approval ||||||| Block Signer Candidate # Validation Authority Weight |||||||
|---|---|---|---|---|---|---|---|---|---|---|---|---|---|---|---|---|---|---|---|---|---|---|---|---|
| | | | | #1 | #2 | #3 | #4 | #5 | #6 | #7 | #1 | #2 | #3 | #4 | #5 | #6 | #7 | #1 | #2 | #3 | #4 | #5 | #6 | #7 |
| x1 | 14 | 7 | 2.0 | ✓ | ✓ | ✓ | ✓ | ✓ | ✓ | ✓ | 47 | 40 | 40 | 60 | 38 | 55 | 26 | 9 | 7 | 7 | 16 | 6 | 11 | 4 |
| x2 | 6 | 6 | 1.0 | ✓ | ✓ | ✓ | ✓ | ✓ | ✓ | ✓ | 33 | 26 | 26 | 46 | 24 | 41 | 12 | 7 | 5 | 5 | 14 | 4 | 9 | 2 |
| x3 | 12 | 6 | 2.0 | ✓ | ✓ | ✓ | ✓ | ✓ | ✓ | ✓ | 27 | 20 | 26 | 40 | 18 | 35 | 6 | 6 | 4 | 5 | 13 | 3 | 8 | 1 |
| x4 | 6 | 6 | 1.0 | ✓ | ✓ | ✓ | ✓ | ✓ | ✓ | | 15 | 8 | 14 | 28 | 6 | 23 | 6 | 4 | 2 | 3 | 11 | 1 | 6 | 1 |
| x5 | 8 | 4 | 2.0 | ✓ | ✓ | | ✓ | | ✓ | | 9 | 8 | 8 | 22 | 0 | 17 | 0 | 3 | 2 | 2 | 10 | 0 | 5 | 0 |
| x6 | 9 | 3 | 3.0 | | | | ✓ | | ✓ | | 9 | 0 | 0 | 14 | 0 | 9 | 0 | 3 | 0 | 0 | 8 | 0 | 3 | 0 |
| x7 | 5 | 1 | 5.0 | | | | ✓ | | | | 0 | 0 | 0 | 5 | 0 | 0 | 0 | 0 | 0 | 0 | 5 | 0 | 0 | 0 |

Fig. 4

CONSENSUS SYSTEM FOR MANIPULATION RESISTANT DIGITAL RECORD KEEPING

This application claims the benefit and priority of U.S. Patent Application No. 62/272,502 entitled "CONSENSUS SYSTEM FOR MANIPULATION RESISTANT DIGITAL RECORD KEEPING" filed Dec. 29, 2015, which is hereby incorporated by reference in its entirety.

This application is a continuation of U.S. patent application Ser. No. 14/706,247 entitled "CONSENSUS SYSTEM FOR TRACKING PEER-TO-PEER DIGITAL RECORDS" filed May 7, 2015, which is hereby incorporated by reference in its entirety.

FIELD OF THE DISCLOSURE

The present invention relates to a system and method for maintaining a manipulation resistant digital ledger. More particularly relates to a system and method for achieving consensus on a shared ledger in a networked system.

DESCRIPTION OF BACKGROUND

Manipulation resistant records that can be relied upon and updated efficiently are important for the efficient functioning of organizations ranging from governments, to companies, to various associations. Records such as votes or financial transactions require a high level of manipulation resistance. Many record keeping systems fail to sufficiently protect against manipulation. Alternatively, the required level of manipulation resistance results in cumbersome and expensive systems of checks, balances, and audits.

Critical record keeping, and in particular the exchange of value, is increasingly moving into the digital realm. Everything from game points, credits, frequent flyer miles, to more traditional financial transactions and records are being tracked digitally. Most of these digital records are tracked by a central record keeping entity or issuing authority. Keeping track of transferrable ownership rights historically required a central record keeping authority trusted by those exchanging said ownership rights. The record keeping authority typically verifies property owners via some form of identification or signature and records all valid property transfers to maintain a record of the current state of ownership. Banks using digital representations of money are trusted to verify identities and keep accurate records of deposits and transfers. Governments keep records of property titles and transfers. A company issuing reward points or game points would also fulfill this role.

There are times, however, when relying on a central authority is not desirable. Participants who rely on digital records to be recorded accurately may feel that a central authority is a single point of potential failure and a single point of trust. This authority may be subject to various internal or external pressures or corruption. There is a need and market for systems of record keeping that function in a more decentralized fashion, thus spreading power over checks, balances, and audits to many participants and automating these processes. For example, crypto-currencies (also referred to herein as cryptocurrency), such as Bitcoin promoted by Bitcoin.org ("Bitcoin"), track digital tokens in a more decentralized manner. A digital currency can be viewed as a prototypical digital ledger that records the association of balances with particular owners. Digital currency units may alternatively be referred to herein as balances or digital assets, tokens, or stake.

Achieving consensus on a digital ledger of transferable ownership rights without a central record keeping authority however presents a considerable technical challenge. The challenge can be broken into a two part problem of achieving verifiable signatures for transfers and maintaining a ledger that is consistent among all participants.

The application of public key cryptography solves one part of the challenge of a peer-to-peer digital currency. Crypto-currencies use cryptographic digital signatures in place of traditional methods of identity verification as proof of ownership of digital assets. Public key cryptography signing algorithms allow for unambiguous digital signatures. A private cryptographic key is a large random number generated locally on a user's computer such that it is known only to that user. A public key can be derived from the private key. As long as the private key is kept secret, any signature produced using the private key serves as proof that the signer is the same party that originally published the public key. In addition to proving the source of a signed message, the signature also ensures that no data in the message can be lost or changed without invalidating the signature. Public keys can be recorded in a ledger of ownership rights. Digital assets can be associated with these public keys such that the public keys serve as the digital representation of the owner of the assets. A transfer of ownership of a digital asset from one public key to another can be signed with the secret private key of the sender to prove the authenticity and integrity of the message.

Unambiguous digital signatures, while useful, do not fully solve the problem of verifiable trusted record keeping. If we imagine an initial public ledger with an agreed upon list of public keys and associated digital assets, any transfers would need to be signed with the corresponding private key known only to the sender in order to be accepted. Any central record keeping authority tasked with recording changes and transfers to the ledger would have no way to forge such a transfer if it was not initiated and signed by the sender. However, many potential combinations of a set (meaning one or more) of valid signed transactions could be joined together by a record keeper to create a seemingly valid record. For instance, some transfers could simply be omitted or censored.

It is also possible for two transactions to each be individually valid but conflict with each other, thus giving the record keeper the choice of which to present. For instance, a digital asset owner may attempt to sell the same asset twice by signing two or more messages that each transfers the asset to a different public key. In such a case, the owner is said to be double spending her asset and the issue of double spending is referred to herein as a Double Spend problem. An untrustworthy record keeper could choose to present different versions of the record at different times or to different people such that the record, even with valid signatures, could not be relied upon.

Accordingly, a decentralized (also referred to herein as peer-to-peer) digital record system that achieves agreement on the record while overcoming additional systemic challenges is desired. Such a system is referred to herein as a consensus system. As used herein, consensus refers to the process by which the entire network agrees on the same ledger. Accordingly, a consensus system is a networked system capable of reaching consensus. Network latency associated with global data transmission prevents all peers from receiving information at the same time or in the same order. Peers may disconnect and reconnect at will, data can be corrupted or missing, and some peers may intentionally supply or relay inaccurate information. These types of challenges to consensus are a long recognized problem in computer science known as a Byzantine Generals Problem. The consensus system must overcome such challenges to allow the creation of a record that can be trusted and cannot be easily manipulated.

Bitcoin is the most well-known attempt to tackle the problem of peer-to-peer consensus for digital token tracking. Peers on a global network will not receive all broadcasted transactions at the same time and in the same order due to, for example, network latency. Therefore, if peers were to simply accept all transactions as they were received and reject anything conflicting that came later, it would lead to disagreement. For instance, if two conflicting transactions were simultaneously broadcast, some peers would receive one transaction first and accept it, and other peers would receive the other transaction first and accept it instead, so there would no longer be a consistent record. In this case, some peers would need to switch to maintain consistency. On the other hand, it should not be possible to get the network to switch to a conflicting transaction broadcast long after the original, as this would defeat the utility of the trustable ledger system.

Bitcoin tackles this issue by grouping transactions into blocks which can generally be propagated to the whole network before a new block of transactions is produced. For example, approximately six times per hour, a new group of accepted transactions, a block, is created, added to a block chain, and quickly published to all nodes on the transaction network system. The rate of this block production is limited by requiring inclusion of a difficult to find solution to a cryptographic function based on the previous block and current block data. If valid solutions are found too quickly, the size of the range of valid solutions adjusts to be more restrictive to increase the difficulty and maintain a reasonably steady rate of block production. Each block references and builds off a previous block using cryptographic functions called hashes. A hash function takes arbitrary digital data as input and returns a fixed length pseudo random number as output. To solve a block, an additional piece of data must be found that when combined with block data, and data that links to the previous block, generates a hash function output that falls within a very restrictive range set by the protocol. Tying each block to its previous block with these hash functions generates what is known as a block chain containing all accepted transactions. A block chain thus forms a public record of all transactions. A current ledger representing the state of ownership of digital tokens can be deduced from the full record of transactions in a block chain beginning with the first block. In a block chain, each block contains a cryptographic hash of the immediate previous block or a similar reference that links it to the immediate previous block. If any data is changed or missing, the calculated cryptographic hashes would change for all blocks from that point forward. The changed hashes would also no longer fall within the restrictive range required by the Bitcoin protocol, so the chain would be invalid.

In the Bitcoin protocol, a valid solution to a block is called a proof of work ("PoW") and the process of finding these solutions is called mining. In other words, mining is the activity of verifying and recording payments into the public ledger. The miner of a block accepted by the network is rewarded in the form of Bitcoin transaction fees from included transactions in addition to a fixed block reward. Only the longest block chain that includes the most PoW is accepted by the network as the consensus block chain. If more than one block solution is found at the same time only one of these blocks can ultimately be accepted, as each block in the chain must reference the preceding block. Other miners must choose to work on a solution that builds off one of these two available blocks and the next published block will make one block chain longer than the other. The shorter chain is then rejected by the network and its miner cannot redeem the block reward.

Miners try to make sure they are always working on the longest known chain in order to ensure that any block found is accepted in the longest chain (also referred to herein as LC) to get the reward. Miners will quickly abandon any shorter chains to avoid expending work without reward. This creates a cooperative process where self-interested miners must cooperate to extend a single longest chain. The longer the chain becomes that builds on an included transaction the more difficult it is to change that transaction. Changing the transaction would require building a longer chain with more proof of work than the public chain. Considering the public chain is built via a cooperative process of miners all over the world, building a longer chain is not an easy task. To create a longer chain in secret in order to change a transaction (such as Double Spend) would essentially require controlling more computation power than the rest of the network combined. It is assumed to be unlikely that any party will control more computation power than the rest of the network adding to the public chain.

Bitcoin's PoW consensus algorithm (also referred to herein as protocol) however, has drawbacks. As the value of Bitcoin has grown, Bitcoin mining has become very competitive. Rather than a decentralized network of people performing PoW using their personal computers, huge warehouses with specialized hardware have been set up to maximize efficiency. Mining pools have been created so operators can pool their PoW together to share block rewards and reduce the uncertainty of reward payouts. PoW also relies on arbitrarily difficult computation and the difficulty is automatically increased if solutions are found too quickly. This computation for the sake of proving computation consumes an enormous amount of electricity. Economies of scale in PoW mining have also allowed control over the Bitcoin ledger to be more centralized than originally anticipated. Therefore, there is a high demand for more efficient algorithms to achieve consensus on a signed shared ledger over a decentralized computer network.

Many attempts have been made to find better PoW algorithms that are more conducive to being solved using standard consumer computing equipment and more resistant to the creation of cheap specialized mining hardware. The Litecoin™ project (Litecoin.org) is an example of such an attempt. These attempts have only delayed the creation of specialized mining hardware and still suffer the same centralization problems due to economies of scale. Specialized hardware is now available for mining Litecoin™. The solution of using a different PoW algorithm also does not address issues of energy waste.

A number of other strategies to consensus have been proposed or are being developed. These consensus algorithms are often implemented in popular crypto-currencies. Crypto-currencies that employ the recently proposed consensus algorithms include Ripple™ (proposed by Ripple Labs), Peercoin (also known as PPCoin or PPC), NXT (an open source cryptocurrency and payment network launched in November 2013 by anonymous software developer BCNext), and BitShares (a decentralized exchange network system proposed by Bitshares.org).

The Ripple™ network uses a consensus algorithm that does not rely on PoW. Ripple™ protocol relies on participants to select a list of trusted nodes and considers transactions confirmed when sufficient agreement is reached among those nodes. A drawback to the Ripple™ consensus algorithm is that there is no system to determine an unambiguous set of validating nodes. If different participants choose to trust different nodes consensus may not be achieved. The means by which a generally accepted list of validating nodes is created may be centralized and choosing alternate nodes creates a risk to the participant of not being in consensus with other participants.

A shared concept behind a number of recently proposed consensus protocols is called proof of stake ("PoS") as opposed to PoW. With PoW, the ability to extend the transaction ledger is proportional to computing power. The idea behind PoS is to make control of the public ledger proportional to ownership stake of the digital currency. It is hoped that PoS will be more energy efficient and more appropriately distribute control over the ledger. A number of PoS systems are structured in a similar way to PoW mining. Just as in PoW mining, PoS mining (also called staking, minting, or forging) requires finding blocks whose block hash falls within a restrictive range; the inclusion of a block in the consensus chain entitles the PoS miner to a block reward. However, the difficulty of finding a valid block hash or the range of valid solutions depends on the ownership stake controlled by the miner who signs the block. Both Peercoin and NXT utilize such a system where stakeholders use their stake to mine for blocks.

There are numerous drawbacks to this method of consensus as well. Unlike with PoW mining, PoS miners do not incur substantial calculation costs when looking for valid block solutions that are not on the current longest chain. Therefore, creating a longer chain than the current longest public chain might be more likely as there is less cost to look for it. Drawbacks to proof of stake systems such as this are known as "Nothing at Stake" problems wherein there isn't sufficient cost, risk, or difficulty to creating an alternate blockchain that could conflict or supplant the public consensus blockchain.

Another example of a nothing at stake problem is the use of old private keys that no longer control balances on the public blockchain to build an alternate blockchain. This problem is sometimes referred to as long range nothing at stake. Many POS systems integrate regular checkpoints that offer some protection against this. A checkpoint prevents a node's software from considering any alternate blockchain that does not contain the checkpoint block. These checkpoints might be distributed by a particular entity such as a software developer or the software itself may create regular checkpoints when it is connected to the network. The downside to relying too much on checkpoints is that it creates the possibility for the network to not form a consensus on one blockchain. If one node accepts a checkpoint that isn't used by all other nodes, a blockchain could emerge that is accepted by some nodes and rejected by others.

Not every stakeholder of a POS blockchain system may desire to maintain a connected node on a personally controlled computer at all times. Such stakeholders are unable to directly participate in validating transactions on the network in real time. Some POS systems allow for stakeholders to delegate this power to validate the block chain to others. This has typically taken the form of "stake leasing" where a balance can be delegated to a single other public key for the purpose of block signing. Stake leasing is implemented on the NxT block chain. Stake leasing was also part of the original design of Delegated Proof of Stake (DPOS) as proposed for the BitShares block chain in April, 2014. A drawback to stake leasing is a potential misalignment of incentives that creates centralization due to leasing to the highest bidder. The means by which delegation occurs and the incentives provided for it must be carefully considered or this will inappropriately concentrate power over the block chain.

Decentralized systems for updateable digital records must reach consensus in the face of network latency, data corruption, and various intentional methods to manipulate or disrupt the system. Accordingly, there is a need for a new peer-to-peer consensus system that provides verifiable signatures and maintains a ledger that is consistent among all participants of the networked system. The new system achieves consensus with less power consumption. In addition, the new system achieves consensus despite network latency, data corruption and other issues. In addition the new system maintains a ledger that is resistant to Double Spend or other intentional manipulation. In addition the new system maintains a ledger wherein superfluous signatures are removed, thus reducing the size of the ledger and improving efficiency. Furthermore, the new peer-to-peer consensus system overcomes the drawbacks of long range nothing at stake.

OBJECTS OF THE DISCLOSED SYSTEM, METHOD, AND APPARATUS

Accordingly, it is an object of this disclosure to provide a system and method for updating a digital ledger with consensus in a network.

Another object of this disclosure is to provide a peer-to-peer system and method for achieving consensus in updating a digital ledger.

Another object of this disclosure is to provide a peer-to-peer system and method for achieving consensus in updating a digital ledger and maintaining a shared manipulation resistant ledger.

Another object of this disclosure is to provide a peer-to-peer system and method for achieving consensus in updating a digital ledger, and overcoming network latency, data corruption and malicious manipulation.

Another object of this disclosure is to provide a peer-to-peer consensus system and method by determining a widest chain.

Another object of this disclosure is to provide a peer-to-peer consensus system and method by determining a widest chain and defending against Double Spend based on the widest chain.

Another object of this disclosure is to provide a method to delete empty blocks on a block chain without compromising the security of the block chain.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a peer-to-peer consensus system and method for creating a trustable ledger which associates digital assets with public cryptographic keys and allows for updating the record in a consensus manner. Transfers and tracking of these digital assets over a computer network is facilitated by protocol rules that encourage the creation of an efficient, trustable, and shared record. Further, in accordance with the principles of the present disclosure, a consensus system is presented that utilizes an improved metric to select a single consensus transaction history from multiple potentially valid transaction histories. A method is described such that when comparing multiple transaction histories, the transaction history with the widest chain is chosen.

The peer-to-peer consensus system includes a plurality of node computers. Each node computer in the plurality of node computer includes a processing unit, some amount of memory accessed by the processing unit, and a network interface operatively coupled to the processing unit and a wide area network. The wide area network can be, for example, the Internet. Each node computer in the plurality of node computer includes a consensus system software application running on the processing unit of the node computer. The consensus system software application is adapted to connect to the plurality of node computers that are connected to the wide area network. The computer software application running on networked computers of the consensus system can be, for example, open source based software.

The consensus system software application is also adapted to generate a cryptographic key pair including a private key and a public key. Moreover, the consensus system software application is adapted to create and sign transactions using the private key and to broadcast transactions to the plurality of node computers. The consensus system software application is adapted to broadcast transactions that associate votes with stake balances. The consensus system software application is further adapted to check validity of all signatures on transactions received from peers, and determine that consensus protocol rules have been followed. The consensus system software application is adapted to build and maintain a local ledger of the current balances of stake controlled by each public key; this ledger is derived from the initial ledger state and the records of transactions contained in the consensus transaction history. The consensus system software application is adapted to choose a consensus transaction history from multiple transaction histories using a metric of widest chain.

The improved system creates a method of automated accounting that is resistant to manipulation. It is therefore valuable to participants due to the high level of trust that can be placed in the system and the low overhead of operation. The system further appropriately balances control over the shared ledger and adds enough opportunity for independent audits, checks, and redundancies that any manipulation requires too much secret collusion and coordination to be practical or worthwhile to attempt. The improved system can codify social or legal agreements about ownership and then automate the accounting of the agreements.

BRIEF DESCRIPTION OF THE DRAWINGS

The foregoing aspects and many of the advantages of the present invention will be more readily appreciated as the same becomes better understood by reference to the following detailed description, when taken in conjunction with the accompanying drawings. Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4 is a table depicting block signer votes and block signers validation authority weights in accordance with the teachings of this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings. Furthermore, a particular order in which certain elements, parts, components, modules, steps, actions, events and/or processes are described or illustrated may not be actually required.

DETAILED DESCRIPTION

Figure 1:
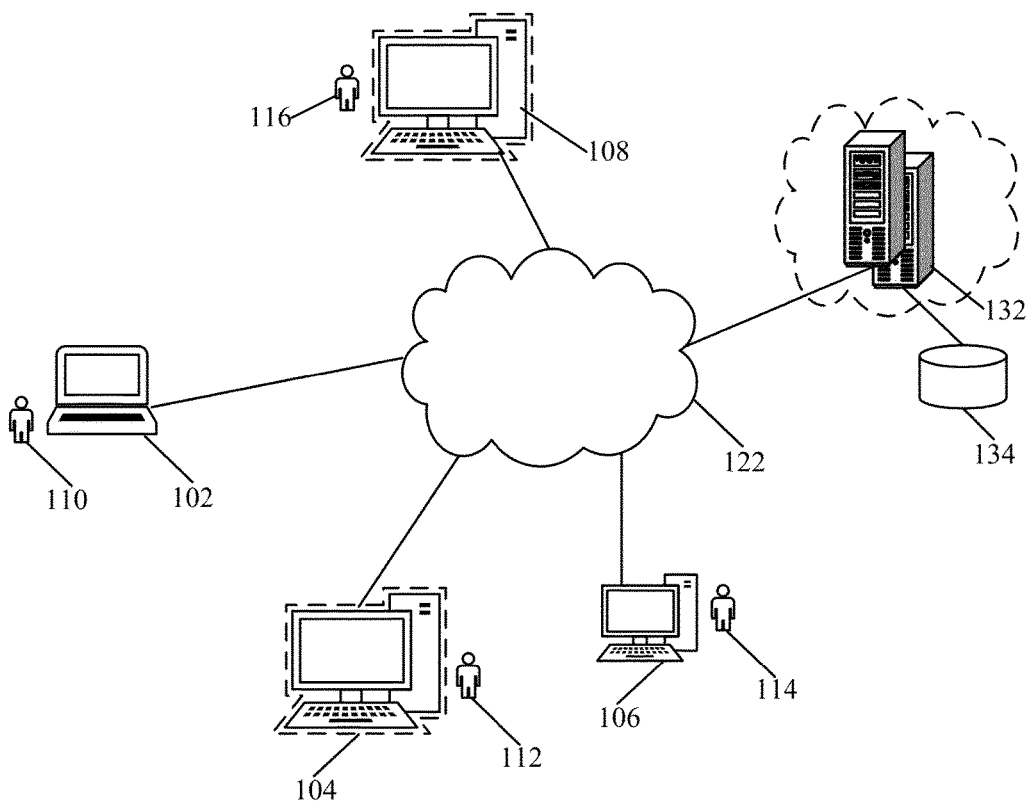
FIG. 1 is a simplified block diagram of a consensus system for maintaining a manipulation resistant updateable ledger in accordance with the teachings of this disclosure.

Turning to the Figures and to FIG. 1 in particular, a networked system for conducting peer-to-peer transactions with consensus is shown and generally indicated at 100. The system 100 tracks digital records with consensus. The system 100 includes a plurality of nodes, such as the computers 102, 104, 106 and 108. Only four nodes 102-108 are shown in the illustrative FIG. 1. A person of ordinary skill in the art will appreciate that more nodes can be included for commercial implementation of the system 100. The computers 102-108 each include a processing unit (such as a central processor), some amount of memory accessed by the processing unit, and a network interface operatively coupled to the processing unit. In addition, the nodes 102-108 each run a special consensus system software application program on their respective processing units. Each node is used and operated by a user, such as the users 110, 112, 114 and 116. The users 110-116 conduct transactions between themselves in a peer-to-peer manner using the special consensus system program. The system 100 is also referred to herein as a consensus network.

The consensus system software application is computer code that performs specific functions for achieving consensus regarding digital asset ownership over the system 100 (as used herein a digital asset can be a digital record, stake, token, voting right etc.) The computer code is written in one or more computer programming languages, such as C++, C#, Java, etc. The computer code controls and actuates the computers 102-108 to perform the unique functions of achieving consensus of transferrable digital objects in the system 100. The computer code is thus analogous to an electronic circuit for performing these specific functions. Accordingly, it can be said that the specialized consensus system software application turns the computers 102-108 into a specialized machine for achieving consensus on an updateable ledger of digital assets in the system 100. It should be noted that the specialized software application may include numerous components residing in different logical layers.

The networked nodes 102-108 are connected over a wide area network 122, such as the popular Internet, via their network interfaces (such as Ethernet or WiFi). The computer 102-108 access the network via the network interfaces. The system 100 may further include one or more centralized computer systems, such as the server system 132, for providing particular centralized services. For example, the server system 132 (such as a distributed server system, a server farm, or a cloud server) can be used to host the specialized consensus system software application for being downloaded by the nodes. The server system 132 is operatively coupled to and accessible over the Internet 122. The server system 132 can also host lists of peers that each node needs for its initial connection to the system 100. The server system 132 may also provide administrative functions for the system 100 and the users 110-116. The server system 132 is operatively coupled to a database 134 containing relevant data. The database 134 can be, for example, a relational database.

With the specialized consensus system software application running on the nodes 102-108, the system 100 achieves consensus on a shared updateable ledger in the system 100 and overcomes the shortcomings of other systems. For example, as further discussed below, the system 100 provides solutions to the issue of PoW energy inefficiency, the Double Spend problem.

Figure 2:
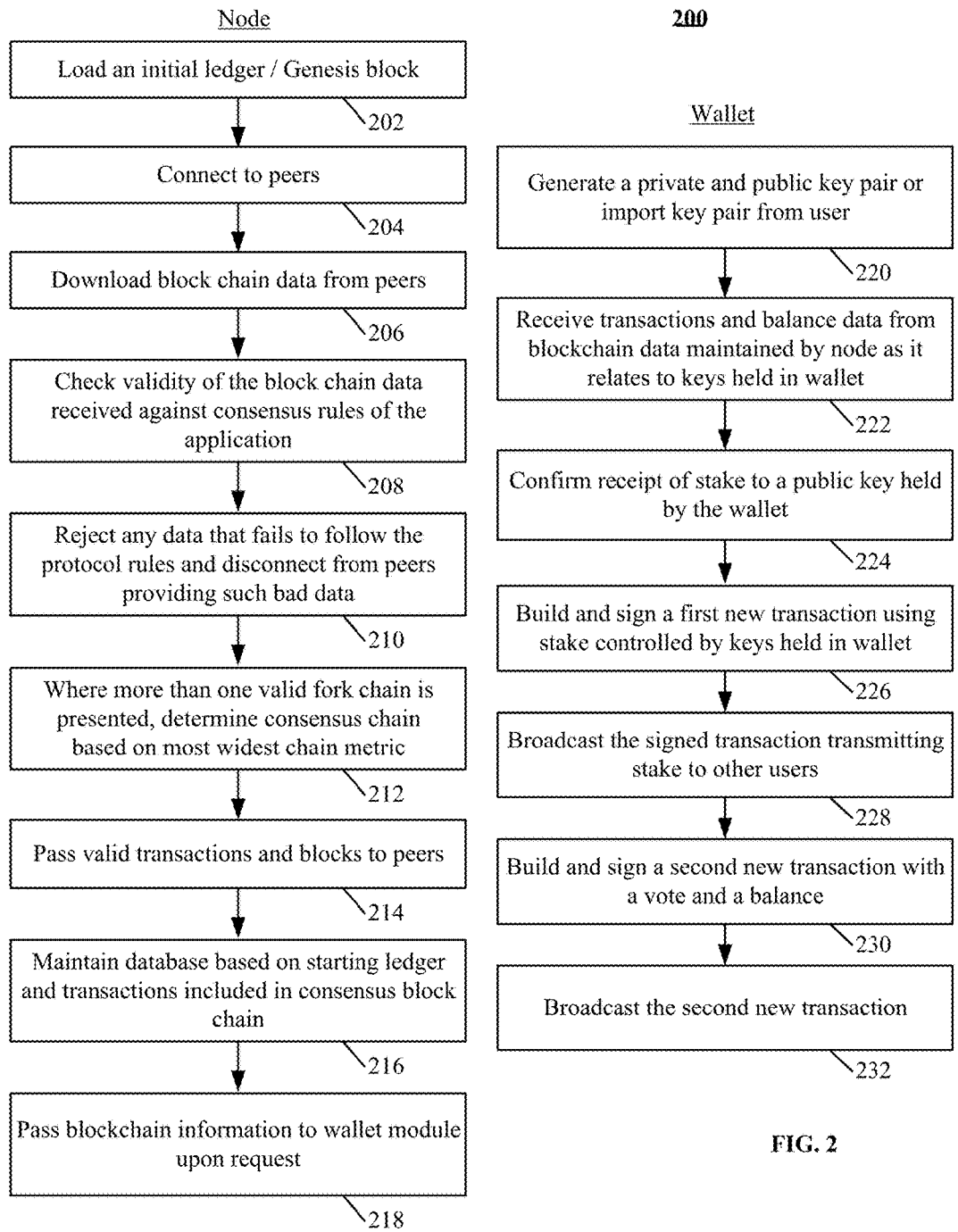
FIG. 2 is a simplified flowchart depicting a process by which a consensus system maintains a shared ledger in accordance with the teachings of this disclosure.
Figure 3:
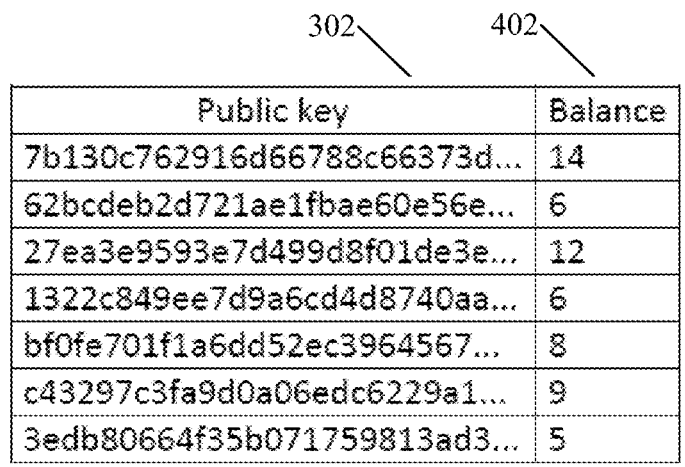
FIG. 3 is a simplified table depicting a ledger of public keys and corresponding stake in accordance with the teachings of this disclosure.

Referring to FIG. 2, a flowchart depicting a process by which a consensus system achieves consensus on a ledger is shown and generally indicated at 200. In one implementation, the consensus system software application includes two modules: node and wallet. The node and wallet modules perform different elements to carry out the functionality of the consensus system software application for achieving consensus on an updateable ledger. The modules run concurrently on a node computer and may interface with each other. In the embodiment depicted, at 202 the node software loads a starting ledger of agreed upon balances tied to a corresponding list of agreed upon public key addresses. This is may be referred to as a genesis block. This starting ledger may be a socially or legally agreed to distribution of stake wherein participating parties provide public keys for inclusion in the starting ledger. The stake balances represent a fungible digital token. The public keys in the genesis block may be supplied by the initial users of the system 100 who generate key pairs offline to maintain the privacy of their corresponding private keys. Although the starting balances and associated public keys are auditable and known to all participants, each public key has an associated private key known only to its owner. The genesis block may also contain votes associated with balances such as for an initial set of block signers. A further depiction of a starting ledger is shown in tables 300 and 400 of FIGS. 3 and 4 respectively.

At 204 the node connects to peers. Lists of initial addresses (such as Internet Protocol addresses) of the peers may be included with the application, published on forums, or available on a public server. Lists of peer addresses are also subject to public audit and may change over time. For example, the list of addresses is downloaded from the server 132 provisioned by a trusted source. Once the node has connected to a group of peers, further peers can be discovered by requesting peers of the current connected peers and a list of these peer addresses can be maintained by the node.

At 206 the application downloads block chain data from peers. At 208 the application checks the validity of block chain data received against the consensus rules of the application. This process includes verifying the cryptographic signatures of any transactions such as transactions transferring stake to a new public key. It also includes checking the cryptographic signatures of block signers. At 210 the application rejects any data that fails to follow the protocol rules. It does not pass this data on to other peers and it typically disconnects from the peer that provided bad data. It should be noted that the consensus system software application continuously performs the elements 206-210 to maintain up-to-date block chain data.

It is possible that more than one transaction history could be received by the node wherein the more than one transaction history is valid per protocol rules. However, the intent of the system 100 is to reach consensus among all honest peers on the same transaction history and it is therefore necessary to select a consensus history if more than one is presented. At 212 the application determines a consensus chain based on the widest chain metric. This metric will be further discussed in detail below. In one implementation, the user of the consensus software application will typically be warned when the application must choose between multiple valid transactions histories or fork chains. This is because the presence of a forked block chain can indicate an intentional attempt by other users to alter the transaction history for the purpose of double spending.

At 214, valid transactions and blocks are passed to peers on the network. At 216 the node application maintains and builds a database or databases that comprise the current ledger. The current ledger of balances is built by starting with the genesis block and applying each subsequent block of transactions that alter the ledger. An additional database can track current votes for block signers as discussed in detail below. At 218, information taken from the consensus transaction record can be passed by request to the wallet module of the consensus system software application.

The wallet module of the consensus system software application allows the user to interact with the consensus system and manage their digital assets. At 220 the wallet module generates a private and public key pair for the user. The user could then provide that public key to others as a receiving address for fund transfers over the network 122. If the user provided a public key that was included in the genesis block the user can import the corresponding private key into the wallet. At 222 the wallet queries the node module for current block chain data associated with the public keys in the wallet. At 224 the walled receives current balance information and any transaction records for the keys held in the wallet and displays this information to the user.

At 226 the wallet allows the user to build a first new transaction that references the stake associated with the public key controlled by the wallet and sign the first new transaction with the corresponding private key. The first new transaction transmits a stake to a different user. At 228 the wallet allows the user to broadcast the first new transactions to the network so that they may be added to and included in the consensus ledger. At 230 the wallet allows the user to build and sign a second new transaction. The second new transaction includes one or more votes for one or more block signer candidates. The second new transaction is signed by the corresponding private key. At 232, the wallet module of consensus system software application broadcasts the second new transaction to connected peer node computers over the network 122.

Auditable Real-Time Multi-Vote System

Not every stakeholder of a blockchain system may desire to maintain a connected node on a personally controlled computer at all times. It is also impractical for a large number of stakeholders with small balances to sign off on each update to the ledger. Allowing stakeholders to delegate their authority to confirm the chain to others they trust makes chain confirmation more efficient. Some systems have allowed a stake balance to be directly delegated to a single other public key for the purpose of chain confirmation. POS mining based chains this is known as stake leasing and functions similar to mining pools for POW mining that centralize power over chain confirmation to a smaller number of people. Unfortunately this type of delegation can result in "delegation to the highest bidder" where stakeholders select the entity they delegate to simply on the amount of block reward that is shared with the stakeholder. This does not result in block signers being selected on the basis of most broadly trusted by stakeholders.

This issue can be addressed by providing balances with multiple simultaneous voting rights. This allows stakeholders to approve many candidate block signers with the full weight of the stakeholders' balances. Ranking block signers by highest stake weighted approval prioritizes block signers with broad trust and approval across the entire stake rather than prioritizing based on intensity of support. It also provides a simple interface for stakeholders as stakeholders need not choose a favorite block signer, rank block signers, or vote against block signers. Instead, they simply approve any block signers they trust and ignore the rest. Accordingly, the system 100 is also referred to herein as a multi vote digital stake system.

The voting mechanism is a continuous real-time stake weighted system that attaches multiple simultaneous voting rights to transferrable digital stake which are tracked in a peer to peer manner, where all voting and transactions are auditable in real time by all participants. Despite the many unique attributes of this system, the voting is in some respects analogous to the concept of "approval voting" as has been used in standard single time point elections. In a standard election, approval voting advantages voters with better access to information about the other voters' likely voting preferences (such as that set forth in the Fair Vote reference filed herewith). However, in the context of a continuous real time auditable consensus system, all stakeholders have complete access to information about how other stakeholders are voting and anyone can change a vote at any time. This allows the stakeholders to change votes accordingly if they choose, and allows the system to settle on an equilibrium voting state or adjust dynamically over time.

Standard approval voting for multiple winner elections lacks proportional representation. For example in the context of electing members to governing body who may be of different political parties approval voting would not provide proportional representation by party affiliation. Analogously, in the context of a consensus system, if 51% of the stake agreed on the block signers they like, those that control the other 49% of stake would not have a way to elect any different block signers. This is not a weakness for a consensus system. All consensus processes must eventually settle on one version of the record and all stakeholders are forced to come to agreement. Any disagreement is ultimately decided in a majority rules fashion by stake, so any coordinated majority controls the system anyway.

Despite the ability of a large coordinated faction to control voting outcomes, in practice there is likely to be a lot of overlap in the voting preferences of digital stake holders and little reason for breakdown into coordinated factions. Owners of stake typically share an interest to maintain the value of the stake and maintain the integrity of the system. Allowing for multiple simultaneous voting rights allows stakeholders to find candidates with the broadest support and elucidate areas of agreement among stakeholders. For example, a block signer that is trusted by all stakeholders, even if not anyone's first choice, can be easily elected under a multi vote digital stake system.

A multi vote digital stake system allows a comparatively high bar to be set for support needed to be elected. In fact it is possible that with a particularly cohesive group of stakeholders all block signers could have over 50% support or some block signers could have almost unanimous support. In contrast, the average stake leased to each block signer in a leased stake system with 50 block signers would be at the very most 2%. This assumes 100% stake participation.

In a multi vote digital stake system, the bar to entry for block signers is higher. Whereas stake leasing systems allow substantial stakeholders to participate in block signing without additional votes or support from other stakeholders. The NXT protocol sets no bar to entry to participate in block signing. Although this may not be commonly viewed as a concern, the high bar to entry for block signers elected by a multi vote system is a useful property.

The high bar to entry for block signers in a multi vote digital stake consensus system can prevent behaviors like Vote Buying from taking hold. In contrast, with a low bar to entry, block signers participating in such behavior can easily begin participating in block signing and selectively sharing any profit only with supporters. With a high bar to entry, a candidate block signer would need to publically appeal for support from as many stakeholders as possible. A vote buyer would take a substantial risk to buy votes before they reached the threshold to get elected, as they may never get there. In such a case, the vote buyer would risk paying for nothing. In a multi vote system, there would more likely be nothing offered for votes unless or until a vote buyer is actually elected. Therefore, until that high threshold is reached, vote buyers can be rationally ignored by those who do not support the behavior.

Even if a vote buyer paid stakeholders for votes before being elected or successfully reaching a threshold to get elected, voting for this block signer to get a reward does not prevent a stakeholder from supporting other block signers. The vote buyer's behavior will likely be viewed in a negative light by a broad community of stakeholders as it is an attempt to selectively favor some stakeholders over others instead of supporting the system as a whole. Stakeholders in a multi vote digital stake system can rationally support candidates who are viewed as good for the community of stakeholders as a whole without added opportunity cost.

Ranking candidates by total approval is a good mechanism to determine a ranking of the most broadly trusted candidates. However, a mechanism to determine a cut-off (or cutoff) or an appropriate number of accepted block signers has to be utilized. An arbitrary number could be chosen as a cutoff. However, if this number were chosen too high, it may allow too many block signers with low approval and low trust to participate. Alternatively, if chosen too low it may not sufficiently diversify and decentralize control of the network and provide the redundancy desired by the stakeholders. Alternatively, a cut-off is chosen by percent support of stake. Using this metric alone makes it possible that no candidate is selected.

Alternatively, a stake weighted average of candidates selected in the voting process is used. Taking a stake weighted mean would allow the number of candidates to be skewed or manipulated by a small stake approving a very high number of candidates. Taking a stake weighted median may be preferable over a mean.

The set of elected block signers can be determined by the previously described method at the point of any block in a block chain. Generally, elected block signers will each sign a single block within a round. At the point of the last block in the round the calculation of new elected block signers will be repeated/updated to include any new votes included in blocks in that round, so as to determine the set of elected block signers that will participate in the next round. The order of block signers within a round is also performed in a deterministic way such that block signers sign blocks in a defined order that is expected by all participants. For example, this order could be chosen in any number of ways such as ordered by total approval. Each block signer is given a defined amount of time to produce a block or otherwise can be skipped by the next block signer in the order.

Widest Chain Metric

Block chain consensus algorithms use metrics to determine the correct chain when presented with more than one fork chain. Correct chain metrics are intended to help prevent the replacement or alteration of a publically known consensus chain. Correct chain metrics are most useful if they provide strong evidence that a particular chain was known to all participants and was the public consensus chain at the time it was built. PoW accomplishes this by the idea that the most PoW can be performed by a cooperative process of all participants. Bitcoin defines the correct chain as the chain with the most PoW. This is often just called the longest chain because under most circumstances the longest chain with the most blocks would also include the most PoW. The correct chain is therefore often called the longest chain because it typically corresponds to the chain with the most blocks. NXT and Peercoin PoS systems use analogous correct chain metrics that correlate to cumulative difficulty and length of the block chain. Delegated Proof of Stake (DPOS) as implemented on the Bitshares blockchain also uses the longest valid chain as the metric for the correct chain in the event of a fork.

A downside to longest chain POS metrics is that multiple signatures from the same stake balance or blocksigner can elongate a chain. For example in DPOS a single block signer will sign a block and extend the chain each time it is her turn; any down time will shorten the potential length of the public chain. In POS mining systems each stake balance must be constantly mining and looking for block solutions to maximize the public chain length. Conversely, a hidden chain need not be constructed in real time and can be constructed in an optimized fashion where opportunities to sign blocks are never missed and any stake balances or block signing keys that are controlled can be used to maximum effect. Importantly, multiple signatures with the same keys do not lend more credibility to a particular fork chain because a hidden chain can easily incorporate multiple signatures using any accessible keys. An additional potential downside to longest chain POS metrics is that it may be resource intense to validate and confirm the length of a long POS chain for the purpose of comparison.

Widest chain metrics take a different approach to current longest chain POS systems. A limited set of blockchain validating authorities (VAs) is defined for each block at the time the block is produced and these VAs are used to disambiguate any forks originating at that block. Each authority within the set can be understood to account for a specified percentage of the combined authority of the full VA set. Fork chains are evaluated by the percentage of the validating authority that has acknowledged each fork chain. The percentage of VA acknowledgement can be called the width of the fork chain. The fork chain with the highest percent acknowledgment is considered the widest chain and is accepted as the consensus chain (assuming the chain follows all other consensus rules). When evaluating a fork and a particular authority has signed a fork chain, signing the same fork chain again with the same authority does not increase the width.

The validating authority list can be small, such as a small group of highest ranked elected block signers, or it could be large such as all unspent transaction outputs weighted by stake (stake balances are typically recorded as unspent transaction outputs, abbreviated UTXOs in the terminology of Bitcoin). A small validating authority list will be quicker to check when comparing forks and quicker to confirm changes to the ledger, but a small validating authority set may be more centralized and therefore less robust against manipulation. Alternatively validating authorities can be combined to get benefits of both small and large validating sets. For example the validating authority of elected block signers could be augmented by a longer list of lower weighted candidate block signers who can also confirm the chain. It is also possible in an alternate embodiment that the validating authority could be layered with a delegated authority, such as elected blocksigners, checked first but this authority can be superseded by a second authority such as unspent transaction outputs (UTXOs).

Turning now to FIG. 4 a table for calculating validation authority weights for block signers is indicated at 400. Each unspent transaction output (UTXO) has an associated balance listed in the column indicated at 402. Each balance in turn has votes associated with it and indicated in section 408. When a balance votes for a set of candidates the full weight of the balance is added to the approval of each candidate (410). Candidates are ranked by summed approval (410) and this determines if a candidate becomes an active block signer or member of the validation authority set. Candidates who are part of the validation set can be weighted differently as illustrated in section 412. Each column in section 412 shows the accumulation of validation weight from each vote a candidate receives, the total validation weight taking into account all votes is indicated in row 424 of section 412. The validation authority weight that any vote adds to a candidate is determined by taking the balance that is voting for the candidate (402) and dividing by the total number of candidates that the balance is voting for (404). For example the UTXO shown in row 419 has a balance of 9 and selects and votes for 3 candidates; each candidate will receive an additional weight of 3 as indicated at cells 426, 428, and 430.

Figure 5:
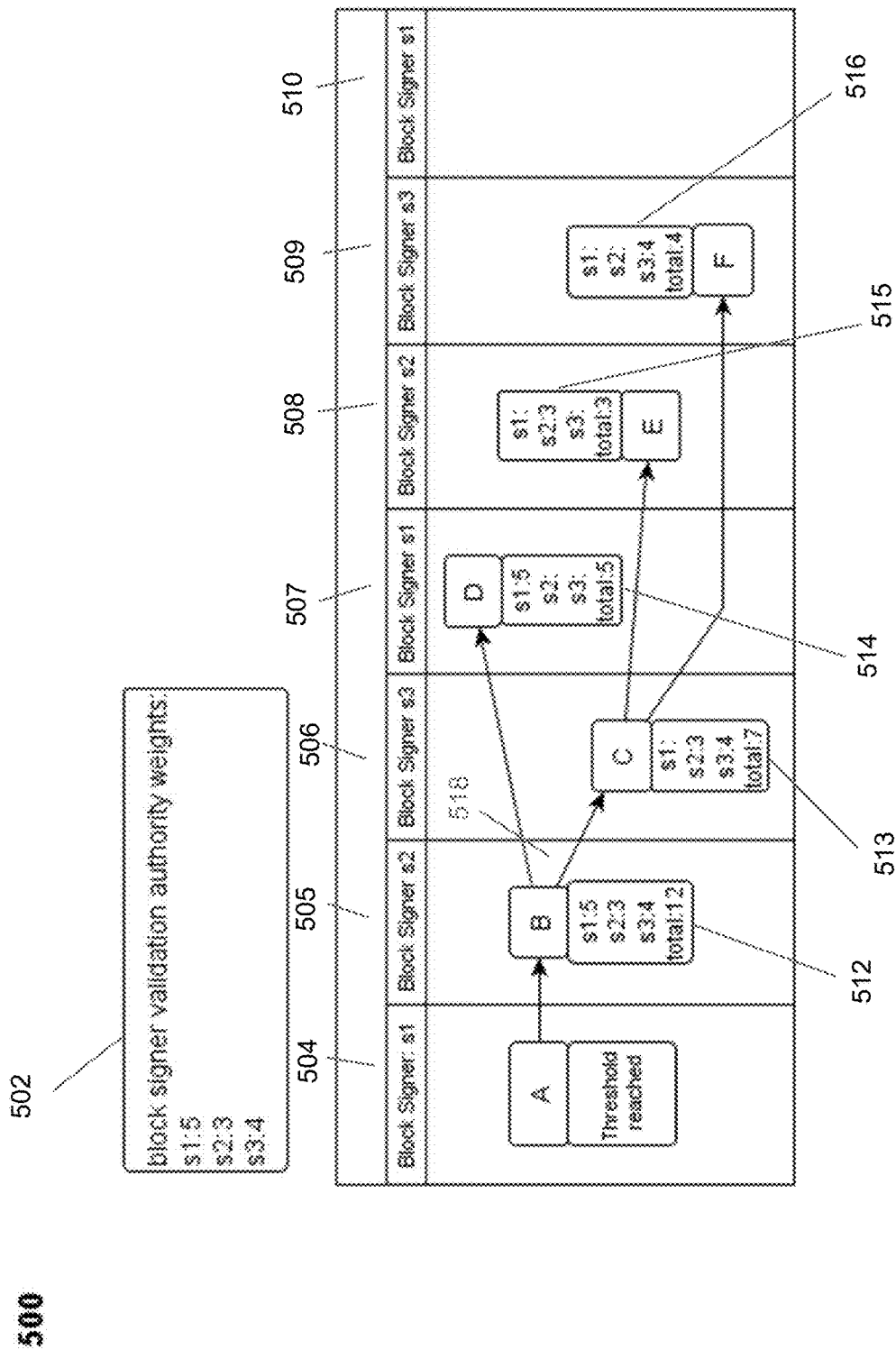
FIG. 5 is simplified diagram depicting a fork with calculated fork chain widths in accordance with the teachings of this disclosure.

Turning now to FIG. 5 a simplified block chain with forks is indicated at 500. The blockchain has three elected block signers (s1, s2, s3) with respective validation authority weights of 5, 3, and 4 as indicated at 502. Each block signer takes turns producing a block in a particular time slot. The time slots are indicated by the columns 504-510. A validation record is maintained for each block indicating which of the members of the validation authority have signed off as having witnessed the block or a subsequent block that follows from it 512-516. The widest chain is determined by evaluating each fork point beginning with the earliest. A fork is evaluated by comparing the total validation of each of the first blocks of the respective fork chains. For example the fork at 518 is evaluated by comparing the validation record of block C (513) with block D (514). In this case, the fork chain beginning with block C (513) is chosen because it has a higher validation total: 7 vs. the validation total at block D (514) is 5. The validation total for each block is calculated by keeping a record of each block signer (or member of the validation authority) that has witnessed the block or a subsequent block stemming from it and summing their validation weights. Block C (513) is acknowledged by block signer s3 because block signer s3 built block C and further built block F (516) that builds off of block C. Note that once block signer s3 has witnessed block C, further acknowledgement by signer s3 does not change the validation of the block; signer s3 is "only counted once". Signer s2 also acknowledged block C by building block E (515) off of it. Signer s3 has a validation weight of 4 and signer s2 has a validation weight of 3 so added together block C has a total validation of 7. Note that even though block E and block F are not on a single linear fork they both have acknowledged block C and both contribute to validating block C. Block D is only acknowledged by block signer s1 who produced block D. Block signer s1 has a validation weight of 5 and therefore block D has a total validation of 5. This fork is resolved in favor of block C that has the higher validation of 7.

The next fork originates at block C and is resolved by comparing the validation of block E (515) and block F (516). In this case block F (516) has a validation total of 4 which is higher than the validation total of block E (515) which is 3. Therefore block F is the unambiguous consensus head block based on this block diagram and the next block signer that follows protocol rules will build off of block F based on this block diagram and validation authority. Note that block E (515), built by block signer s2, contributes to fork resolution by validating block C even though it is not a precursor of the current best head block. Therefore block E must be kept by nodes of the system 100 at least until block C is validated by block signer s2 via another block Storing and updating a validation record for every block in a blockchain can be an expensive operation, therefore a threshold for validation can be established beyond which maintaining these records is unnecessary under most circumstances. For example, a threshold could be used such that a block with greater than 50% of the potential validation meets the threshold. In the case of a block with a validation authority shown at 502 the three block signers s1, s2, and s3 have validation weights of 5, 3, and 4, and the potential total validation of a block would be 12. Anything over 6 would meet a 50% threshold. In the example blockchain at 500, blocks A, B, and C would all meet this threshold. It is generally unlikely that conflicting chains would both meet this threshold as it would require block signers to sign both chains. In the event that a peer claims to have a wider fork chain than a currently known chain that meets threshold validation, the peer must prove that their chain at least meets threshold validation before complete validation records are generated for that fork point.

Augmented Validation Authority

Figure 7:
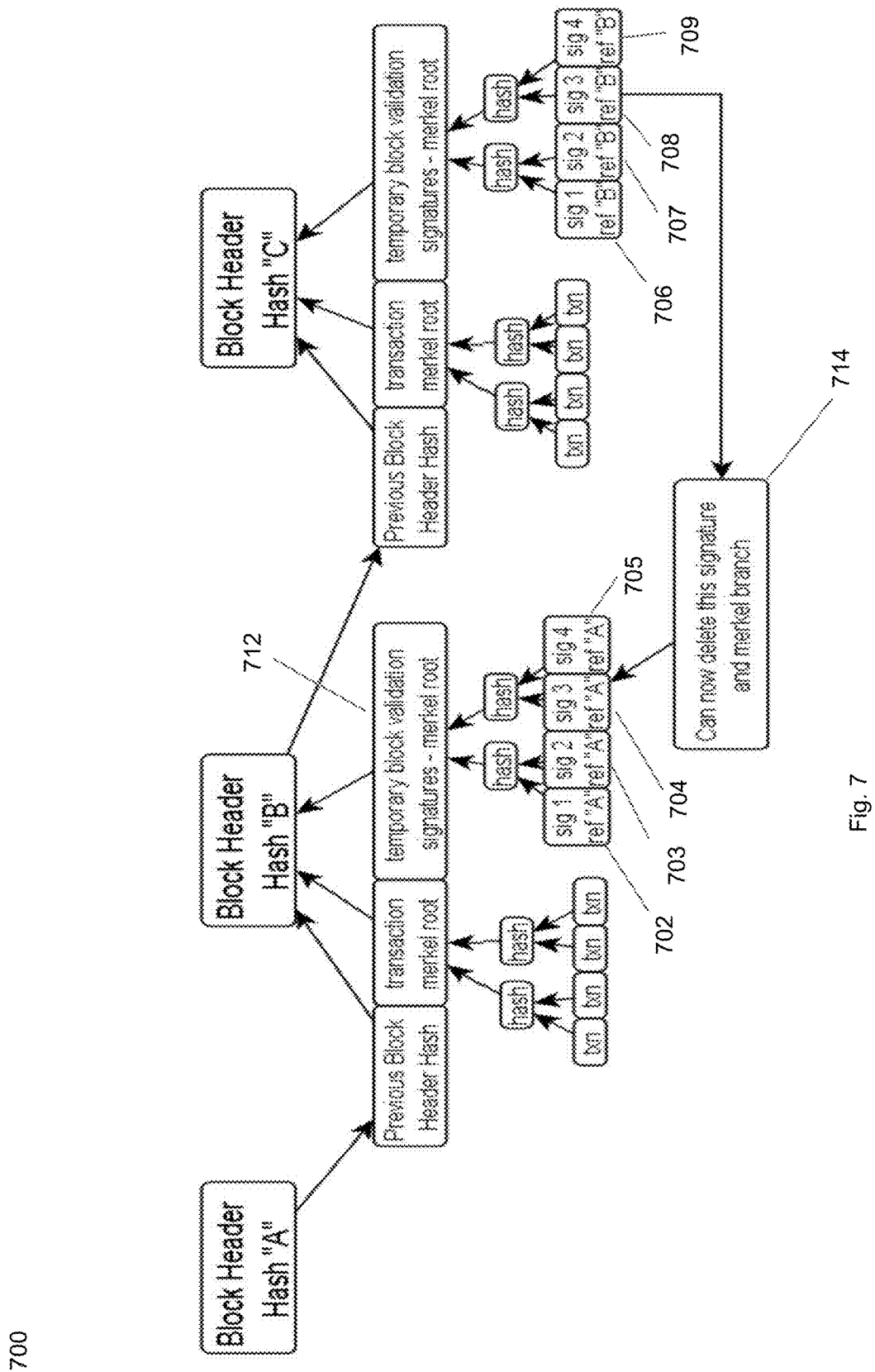
FIG. 7 is simplified diagram depicting an augmented validating authority with pruning in accordance with the teachings of this disclosure.

Turning now to FIG. 7. An example of augmented validation authority is shown at 700. An augmented validation authority set could include all block signers and a number of candidate block signers with lower approval than required to be elected. The validation weight of these candidate block signers can be determined by the same method as the validation weight assigned to elected block signers as illustrated at 400. While not producing blocks these candidate block signers could produce signatures on recent block hashes that get included in blocks. These block validation signatures are illustrated at 702 to 709. The signatures 702-705 are included in block "B" and reference a block hash of a prior known block (Block "A"), The signatures 706-709 are included in Block "C" and reference a block hash of a prior block (Block "B"). In the embodiment at 700 validation signatures are organized in a merkel tree whereby successive hashes reach a merkel root that is included in the block header. A similar merkel tree system is used for transactions in the Bitcoin protocol. Augmented validation authorities allow more people to participate directly in validating the chain however it requires more resources to keep these longer lists of validating authorities.

Augmented validating authority signatures can be pruned or deleted when the same signer acknowledges the chain at another point further along as shown at 714. For this reason these signatures can be considered to be stored on a temporary basis. When one of these authorities produces a new signature that references a block that follows a block referenced by a prior signature, the prior signature can be deleted as it is superfluous and no longer impacts fork resolution (widest chain metrics ignore duplicate signatures using the same key). This is illustrated by the deletion of signature 704 which references block hash "A". This signature is no longer needed after the same signer references block hash "B" with a new signature at 708. The merkel tree structure, allows the deletion of individual signatures while not affecting the rest of the signatures in the merkel tree.

Figure 6:
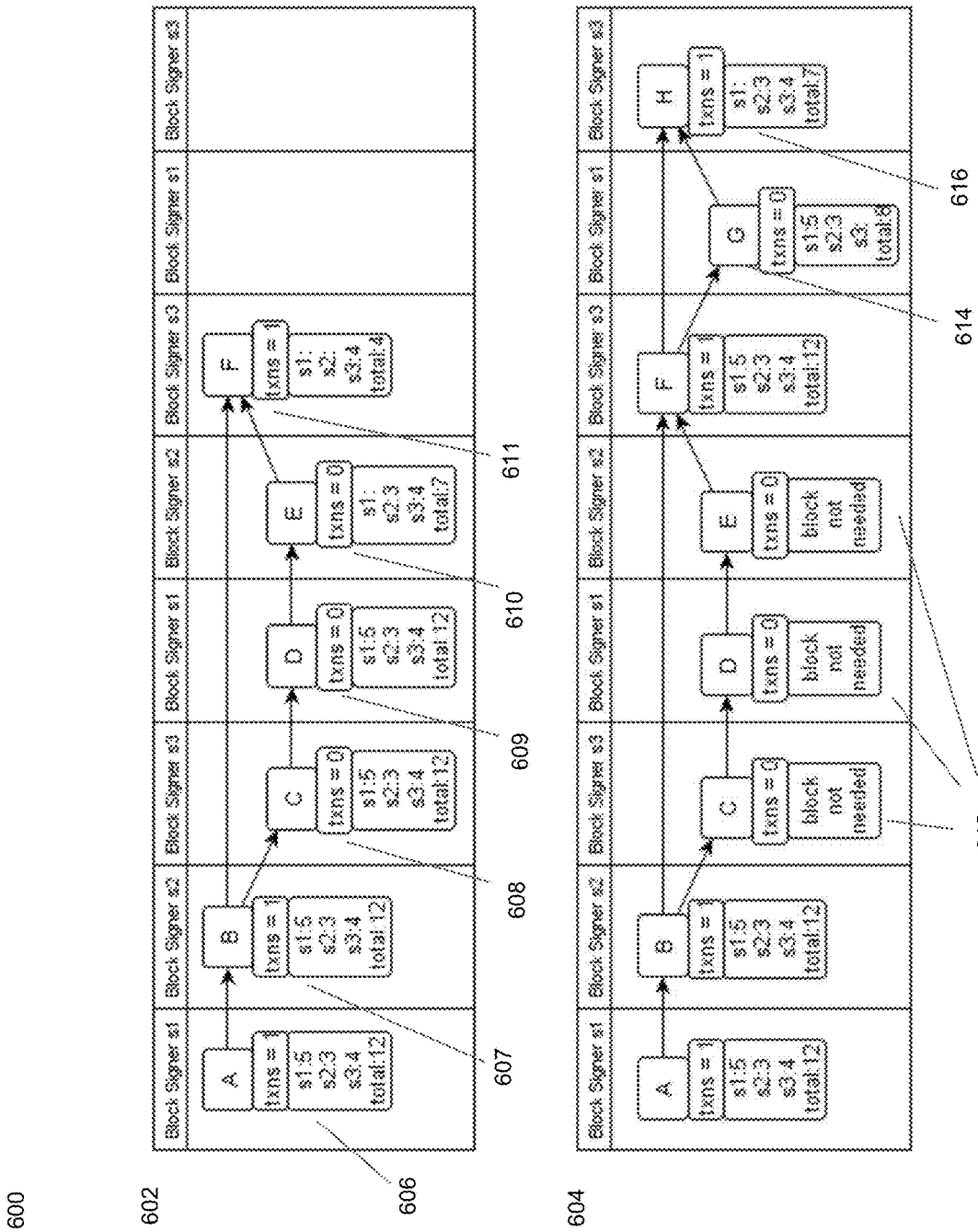
FIG. 6 is simplified diagram depicting block pruning in accordance with the teachings of this disclosure.

Widest chain metrics also allow pruning of empty blocks that do not contain transactions. Turning now to FIG. 6 a block chain diagram is shown at two points in time (602 and 604). FIG. 6 illustrates how widest chain consensus metrics allow for superfluous empty blocks to be pruned without compromising chain security. The block diagram at 602 shows empty blocks C, D, and E (608-610) that do not contain transactions. The block F (611) that builds off block E (610) contains a transaction. In the embodiment depicted at 600, block F references both its prior block, block E (610), and also references the last block that contained transactions, block B (607). This reference is accomplished by including a hash of block E and block B in the header of block F.

In the block diagram at 604, further blocks G (614) and H (616) are built on top of block F. Now each block signer; s1, s2, and s3 has acknowledged block B without the need for blocks C, D, and E. Duplicate signatures do not add to the width of a chain or increase the validation of a block. Blocks C, D, and E do not contain transactions and only function as duplicated validation signatures of block B, they can therefore be deleted (618) without effecting block validation or fork resolution.

At 614 we can further see that block G, created and signed by block signer s1, contains no transactions and this block is eligible for deletion once block signer s1 produces a new block building off the same chain.

Layered Validation Authority

Figure 8:
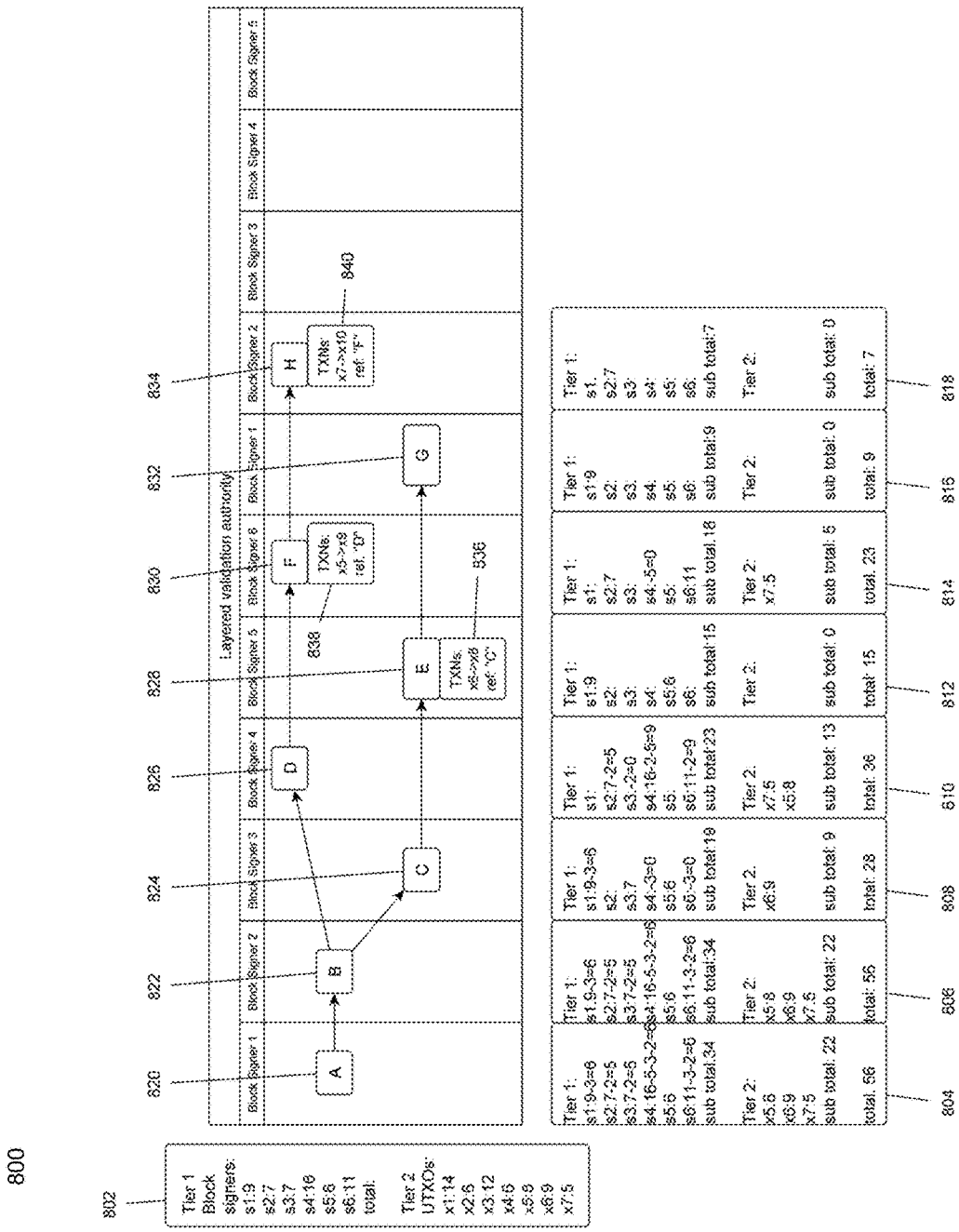
FIG. 8 is simplified diagram depicting fork resolution using a layered validating authority in accordance with the teachings of this disclosure.

Turning now to FIG. 8, a block chain diagram showing layered validation authority is indicated at 800. Layered validation authority uses a $1^{st}$ tier validation authority such as block signers as shown in FIG. 4 at 400 and combines this with a $2^{nd}$ tier validation authority such as all active stakeholder balances. Active stakeholder balances are typically recorded as unspent transaction outputs (UTXOs). The table at 400 shows the stake balances and elected block signers that are used in the block chain diagram at 800. Block signer s7 in table 400 is not elected and therefore does not participate in block signing in the block diagram 800. In a layered validation authority scheme the signature of a validation authority in one tier affects the validation weights of another tier. For example in a validation scheme using delegated block signers for a 1st tier and UTXOs as a 2nd tier, validation by a UTXO balance, may reduce the validation weight of the block signers that the balance is voting for. This way a particular balance can delegate their validation authority or validate directly but the stake is not "counted twice" if both the delegated authority and direct authority sign the chain.

At 802 a list of the tier 1 and tier 2 validation authority weights are shown for the blockchain segment illustrated in FIG. 8. Blocks are indicated at 820 to 834 and below each block at 804-818 the validation record for the block is shown. A complete validation record need not be maintained for all blocks indefinitely as a threshold for validation can be used.

At 816 validation of block "G" (832) is shown. Block "G" is signed by block signer s1 who has a validation weight of 9 as shown in table 802. This is the only validation of block "G" as there are no further blocks built on top of it therefore the validation table 816 shows a total validation of 9. At 812 the validation of block "E" (828) is shown. Block "E" is created and signed by block signer s5. Block signer s5 contributes a validation weight of 6 as shown at 812. Block "E" is also validated by block signer s1 via block "G" (832). The transaction included in block "E" (x6->x8) shown at 836 references the previous block "C" and therefore does not validate block "E". At 808 the validation of block "C" is shown. Block "C" (824) is signed and validated by block signer s3. It is also validated by block signer s5 via block "E" and block signer s1 via Block "G". The validation weights of block signers s3, s5, and s1 are recorded in the validation table for block "C" shown at 808. The transaction 836 (x6->x8) references block "C" and is weighted by its balance of 9 in the tier 2 validation shown in table 808. The UTXO x6 has a balance of 9 and votes for 3 block signers (s1, s4, and s6) as seen in table 400. These votes add a weight of 3 to each of the block signers (s1, s4, and s6) as seen in table 400. When UTXO x6 directly validated block "C" in the transaction at 836 the validation weights of the block signers that x6 is voting for are accordingly reduced in the validation table for block C (808) and in the validation table for precursor blocks A (820) and B (822). This way the validation weight of balance x6 is not double counted when validating the chain directly or via delegation to block signers. Accordingly the tier 1 validation weights of block signers s1, s4, and s6 can be seen to be reduced by 3 as indicated with a "−3" in table 808. Block signer s1 which validated block C (824) by producing block G (832) now only contributes a weight of 9−3=6 to the validation of block C as seen in table 808. The validation weights of s4 and s6 are also reduced by 3, however, because these block signers have not validated Block C these reductions don't yet effect the validation of block C. This reduction of validation weight for s4 and s6 is noted in table 808 with "−3=0" indicating that the validation weight for the block signer is reduced but does not yet impact the validation total. Block C has a total validation of 28 which is the sum of the Tier 1 and Tier 2 validation (shown at 808).

At 818 validation of block "H" (834) is shown. Block "H" is signed by block signer s2 with a weight of 7, this is the only validation of block H as there are no further blocks built on top of it. The transaction included in block "H" (x7->x10) shown at 840 references the previous block "F" and therefore does not validate block "H". At 814 the validation of block "F" is shown. Block "F" (830) is signed and validated by block signer s6, it is also validated by block signer s2 via block "H" (834). The transaction 840 (x7->x10) references block "F" and is weighted by its balance (5) in the tier 2 validation. The UTXO balance x7 is voting for one block signer, block signer s4, as seen at 422. Therefore in the tier 1 validation authority, the size of the balance (5) is removed from the validation weight of block signer s4. At 810 the validation of block "D" (826) is shown. Block D is validated by three block signers s4, s6, and s2 and is validated by two UTXO transactions x5->x9 (838) and x7->x10 (840). The block signer validation weights are included in the tier 1 validation of block "D" and the two transactions are included in the Tier 2 validation of block "D". The transactions reduce the validation weight of the block signers that the UTXOs were voting for. The total validation of block D (826) is 36 as shown in table 810.

To resolve the fork beginning at block B (822) the total validation of block C (824) is compared to the total validation of block D (826). Block D has a higher validation of 36 (810) compared to block C with a validation of 28 (808). Therefore the fork chain beginning with Block D is considered the consensus chain.

Figure 9:
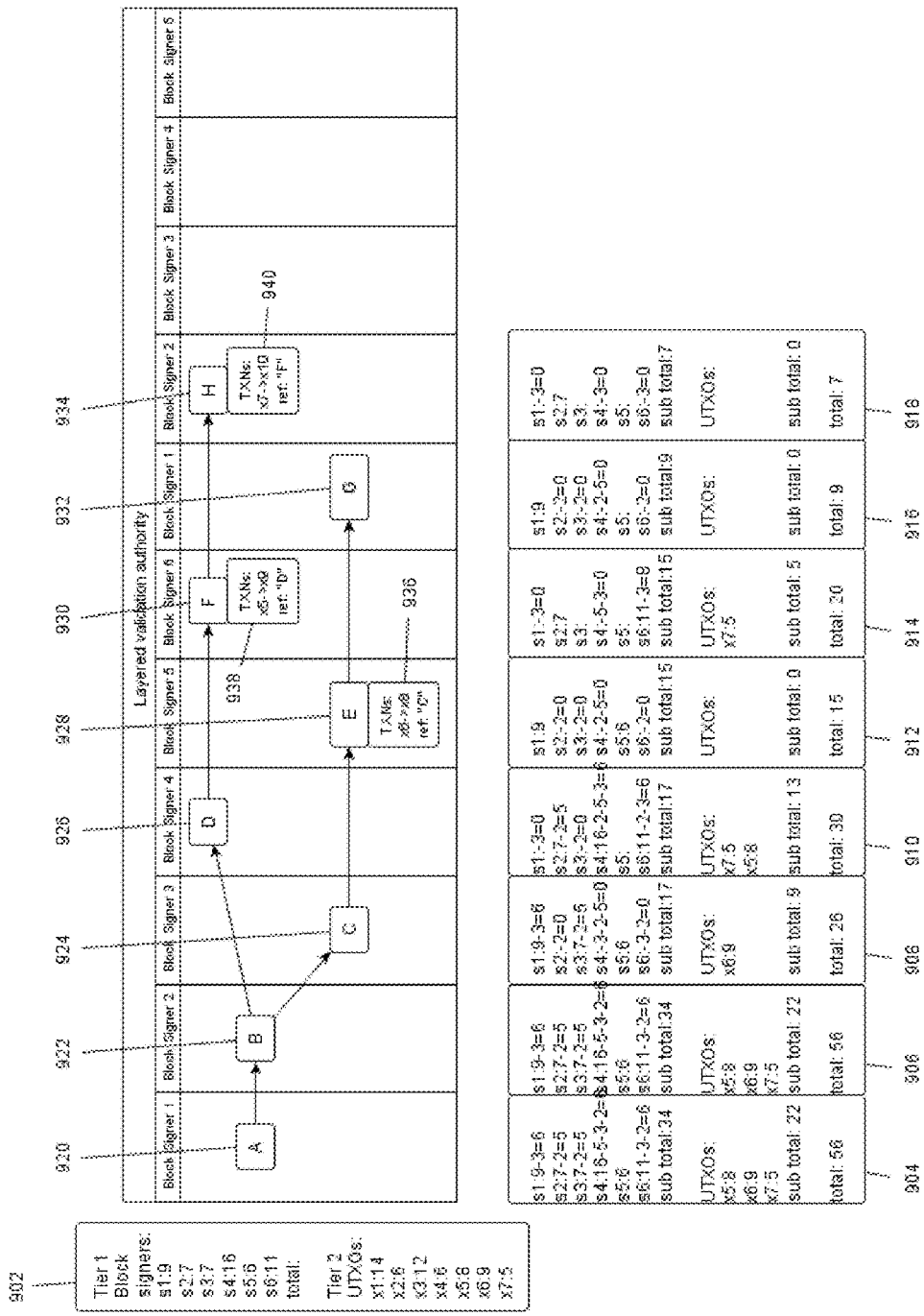
FIG. 9 is a simplified diagram depicting fork resolution using a layered validation authority where a 2nd tier validation authority overrides a $1^{st}$ tier validation authority when the two conflict.

In an alternate embodiment of layered validation authority shown in FIG. 9 the 2nd tier validation authority overrides the first tier validation authority when the two are in conflict. FIG. 9 depicts the same block diagram as FIG. 8 however, in the validation authority tables (904-918) any UTXO used in a transaction on one fork chain reduces the validation weights of the block signers the UTXO votes for on conflicting fork chains. For example, UTXO x7 votes for only block signer s4 (422) and contributes a validation weight of 5 to block signer s4. The transaction x7->x10 (940) that spends UTXO x7 reduces the validation weight of block signer s4 on the alternate fork chain beginning with block C. This type of layered validation scheme allows for fast validation by block signers or other delegated signers but also creates a hard validation by UTXOs that is more decentralized and would be chosen over a chain created simply by a collusion of block signers.

Program Listing

A program listing has been submitted with this patent application and is incorporated by reference in its entirety.

SUMMARY

Obviously, many additional modifications and variations of the present disclosure are possible in light of the above teachings. Thus, it is to be understood that, within the scope of the appended claims, the disclosure may be practiced otherwise than is specifically described above without departing from the true spirit and scope of the present invention.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A decentralized consensus system for maintaining a shared digital ledger, the system comprising:
   i) a node computer including a processing unit, some amount of memory accessed by said processing unit, and a network interface operatively coupled to said processing unit and a wide area network;
   ii) said node computer including a consensus system software application running on said processing unit of said node computer; and
   iii) said consensus system software application adapted to:
      1) load an initial ledger;
      2) connect to peer nodes over said wide area network;
      3) download block chain data from connected peer nodes running said consensus system software application, said block chain data constructed by said consensus system software application running on said connected peer nodes, said block chain data including a block chain having a set of fork chains and a set of blocks, each fork chain within said set of fork chains including a subset of blocks of said set of blocks, each block within said set of blocks created by a creator block signer within said set of block signers using said consensus system software application running on a first peer node corresponding to said creator block signer, each block signer within said set of block signers corresponding to a block signer validation authority weight, each block within said set of blocks corresponding to a validation record, said validation record including a set of signed validation authority weights corresponding to said set of block signers respectively, each signed validation authority weight within said set of signed validation authority weights being zero or more, said validation record including a signed validation authority weight total being a sum of said set of signed validation authority weights, each block signer validation authority eight being a sum of validation weights corresponding to a set of stake balances, each stake balance within said set of stake balances corresponding to subset of voted block signers within said set of block signers, each voted block signer within said subset of voted block signers receiving an equal partial portion of a validation weight associated with said stake balance, wherein:
      a) for each block within said set of blocks, said signed validation authority weight corresponding to said creator block signer of said block is the same as said block signer validation authority weight of said creator block signer of said block;
      b) for each block within said set of blocks, where a different block within said set of blocks is built off of said block, said signed validation authority weight corresponding to said creator block signer of said different block is the same as said block signer validation authority weight of said creator block signer of said different block;
   4) where said set of fork chains includes more than one fork chain, determine a consensus data block chain based on a widest chain metric, wherein:
      a) said set of fork chains includes a first fork chain starting with a first block within said set of blocks and a second fork chain starting with a second block within said set of blocks; and
      b) said signed validation authority weight total of said first block is higher than said signed validation authority weight total of said second block, wherein said signed validation authority weight total of said first block indicating said widest chain metric.

2. The decentralized consensus system of claim 1 wherein:
   i) said set of blocks includes a third block, a fourth block built off of said third block by a fourth block signer within said set of block signers, and a fifth block built off of said third block by a fifth block signer within said set of block signers;
   ii) said third block contributes to fork resolution by validating said third block;
   iii) said fourth block contributes to fork resolution by validating said third block;
   iv) said signed validation authority weight total of said fourth block is higher than said signed validation authority weight total of said fifth block; and
   v) said consensus system software application is further adapted to keep said fifth block for at least until said third block is validated by said creator block signer of said fifth block via a new block, wherein said new block is not within said set of blocks.

* * * * *